US012769368B2

United States Patent

(12) United States Patent
Jeong et al.

(10) Patent No.: US 12,769,368 B2
(45) Date of Patent: Oct. 20, 2026

(54) DISPLAY DEVICE

(71) Applicant: Samsung Display Co., LTD., Yongin-si (KR)

(72) Inventors: Jae Won Jeong, Yongin-si (KR); Jong Hyuck Kim, Yongin-si (KR); Cheol Yeong Park, Yongin-si (KR); Ju Yeop Seong, Yongin-si (KR); Hee Kwon Lee, Yongin-si (KR); Jae Soo Jang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 110 days.

(21) Appl. No.: 18/662,605

(22) Filed: May 13, 2024

(65) Prior Publication Data

US 2025/0076927 A1 Mar. 6, 2025

(30) Foreign Application Priority Data

Aug. 31, 2023 (KR) ........................ 10-2023-0115392

(51) Int. Cl.
*G06F 1/16* (2006.01)

(52) U.S. Cl.
CPC .................................. *G06F 1/1652* (2013.01)

(58) Field of Classification Search
CPC .......... G06F 1/1652; G09F 9/30; G09F 9/301; H10K 59/87; H10K 59/122; H10K 59/124; H10K 59/129; H10K 59/131; H10K 59/40
See application file for complete search history.

(56) References Cited

U.S. PATENT DOCUMENTS

| | | | | | |
|---|---|---|---|---|---|
| 5,442,470 | A * | 8/1995 | Hashimoto | G02F 1/13452 349/149 |
| 11,152,595 | B2 * | 10/2021 | Jeon | G09F 9/301 |
| 2019/0074332 | A1 * | 3/2019 | Kim | G01K 13/00 |
| 2019/0318689 | A1 * | 10/2019 | Kim | H05K 1/028 |
| 2020/0057472 | A1 * | 2/2020 | Kang | G06F 1/1601 |
| 2021/0005677 | A1 * | 1/2021 | Lee | G06F 3/0448 |
| 2021/0043693 | A1 * | 2/2021 | Kim | G06F 3/0446 |
| 2021/0119177 | A1 * | 4/2021 | Bang | G06F 3/0412 |
| 2021/0201711 | A1 * | 7/2021 | Yun | H10K 50/868 |
| 2021/0255367 | A1 * | 8/2021 | Kim | G02B 1/11 |

(Continued)

FOREIGN PATENT DOCUMENTS

| | | | |
|---|---|---|---|
| KR | 1020180035339 | A | 4/2018 |
| KR | 1020190119244 | A | 10/2019 |
| KR | 1020220095665 | A | 7/2022 |

*Primary Examiner* — Sagar Shrestha
(74) *Attorney, Agent, or Firm* — CANTOR COLBURN LLP

(57) ABSTRACT

A display device includes a display panel including a display area for displaying an image and a sub-area extending in one direction from the display area, where the sub-area includes a bending area bent in a rear direction of the display area, and an outer portion extending from the bending area to overlap the display area, a display driving circuit disposed on the outer portion of the sub-area to drive pixels of the display area, a bending protection member disposed to cover the bending area of the sub-area, a rear surface cover disposed on a rear surface of the display panel to cover the outer portion of the sub-area, and the display driving circuit, and an adhesive tape covering an end of the rear surface cover adjacent to the bending area.

18 Claims, 14 Drawing Sheets

(56) References Cited

U.S. PATENT DOCUMENTS

| | | | | |
|---|---|---|---|---|
| 2022/0302405 | A1 * | 9/2022 | Choi | B23K 26/364 |
| 2022/0320233 | A1 * | 10/2022 | Wang | H04M 1/0266 |
| 2022/0384746 | A1 * | 12/2022 | Wang | H10K 77/111 |

* cited by examiner

DISPLAY DEVICE

This application claims priority to Korean Patent Application No. 10-2023-0115392, filed on Aug. 31, 2023, and all the benefits accruing therefrom under 35 U.S.C. 119, the content of which in its entirety is herein incorporated by reference.

BACKGROUND

1. Field

Embodiments of the disclosure relate to a display device.

2. Description of the Related Art

With the advance of information-oriented society, more and more demands are placed on display devices for displaying images in various ways. For example, the display devices have been applied to various electronic devices, such as a smart phone, a digital camera, a smart watch, a laptop computer, a navigation system, and a smart television.

The display device may be a flat panel display device such as a liquid crystal display device, a field emission display device and an organic light emitting display device. In the light emitting display device among the flat panel display devices, since each of pixels of a display panel includes a light emitting element capable of emitting light by itself, an image can be displayed without using a backlight unit for providing light to the display panel.

Display devices that are mainly used as portable devices, such as smartphones, tablet devices, and smart watches, can be exposed to accidents such as getting wet in the rain or dropping into water. If the display device is submerged or water falls on the display device, moisture may penetrate into the internal space of the display device. Therefore, a more secure water-proof structure may be desired to be applied to the display device to prevent moisture from penetrating into the internal space of the display device when submerged.

SUMMARY

Embodiments of the disclosure provide a display device capable of forming a bending protection member in a bending area of a display panel and increase reinforcement efficiency in the bending area.

Embodiments of the disclosure also provide a display device capable of improving water-proofing and moisture-proofing efficiency by defining a bending area which is an area where a bending protection member is formed and improving the water-proof and moisture-proof structure.

However, features of embodiments of the disclosure are not restricted to those set forth herein. The above and other features of embodiments of the disclosure will become more apparent to one of ordinary skill in the art to which the disclosure pertains by referencing the detailed description of the disclosure given below.

According to an embodiment of the disclosure, a display device includes a display panel including a display area for displaying an image and a sub-area extending in one direction from the display area, where the sub-area includes a bending area bent in a rear direction of the display area, and an outer portion extending from the bending area to overlap the display area, a display driving circuit disposed on the outer portion of the sub-area to drive pixels of the display area, a bending protection member disposed to cover the bending area of the sub-area, a rear surface cover disposed on a rear surface of the display panel to cover the outer portion of the sub-area, and the display driving circuit, and an adhesive tape covering an end of the rear surface cover adjacent to the bending area.

In an embodiment, the bending protection member may extend to cover a partial area of the outer portion of the sub-area overlapping the display area, and the bending protection member may be disposed between the rear surface cover and the outer portion of the sub-area.

In an embodiment, a portion of the bending protection member, which is disposed between the rear surface cover and the outer portion of the sub-area, may be separated into two portion, which are spaced apart from each other, and one of the two portion may be disposed adjacent to the display driving circuit.

In an embodiment, the display device may further include a bending boundary pattern formed in a straight line shape, a curved line shape or a combination thereof along a boundary of the outer portion and the bending area of the sub-area, and the bending protection member may cover the bending area of the sub-area with the bending boundary pattern defining the boundary.

In an embodiment, the adhesive tape may cover at least one contact area selected from a first contact area including a contact portion between the bending protection member and the bending boundary pattern and a second contact area including a contact portion between the bending boundary pattern and the rear surface cover.

In an embodiment, a thickness or a height of an end portion of the rear surface cover adjacent to the bending boundary pattern may be thicker or higher than a thickness or a height of the bending protection member or a thickness or a height of the bending boundary pattern.

In an embodiment, the display device may further include an additional bending boundary pattern formed on a rear surface of the rear surface cover, and the adhesive tape is formed to cover at least one contact area selected from a first contact area including a contact portion between the bending protection member and the bending boundary pattern, a second contact area including a contact portion between the bending boundary pattern and the rear surface cover, and a third contact area including a contact portion between the rear surface of the rear surface cover and the additional bending boundary pattern.

In an embodiment, the bending protection member may be separated into two parts to cover the bending area and the outer portion of the sub-area, respectively, the two parts of the bending protection member may be spaced apart from each other not to overlap the bending boundary pattern at a boundary between the bending area and the outer portion of the sub-area, and the rear surface cover may be disposed to cover one of the two parts of the bending protection member covering the outer portion of the sub-area and the display driving circuit.

In an embodiment, the display device may further include an additional bending boundary pattern formed on the one of the two parts of the bending protection member covering the outer portion of the sub-area, and the adhesive tape may cover a contact portion between the additional bending boundary pattern and the rear surface cover.

In an embodiment, the bending protection member may be coated or applied in the bending area through at least one process selected from an inkjet printing process, a photoresist process, and a spin coating process, and the bending protection member may include an organic or inorganic material used to formed a pixel defining layer, a planarization layer, and an encapsulation layer formed in the display area, at least one organic material selected from acrylic, benzocyclobutene (BCB), or hexamethyldisiloxane (HMDSO), or a pressure sensitive adhesive material including ultraviolet (UV)-curable acrylic resin.

In an embodiment, the bending boundary pattern includes at least one adhesive curing material selected from resin, optical clear adhesive (OCA), optical clear resin (OCR), or pressure sensitive adhesive (PSA), or an inorganic material including at least one selected from a pressure sensitive adhesive and a photoresist.

According to an embodiment of the disclosure, a display device includes a display panel including a display area for displaying an image and a sub-area extending in one direction from the display area, where the sub-area includes a bending area bent in a rear direction of the display area, and an outer portion extending from the bending area to overlap the display area, a touch sensing unit formed on a front surface of the display area to sense a touch of a user or an object, a display driving circuit disposed on the outer portion of the sub-area to drive pixels of the display area, a display circuit board electrically connected to one end of the outer portion of the sub-area, a touch driving circuit disposed on the display circuit board to drive a touch sensing unit, a bending protection member formed to cover the bending area of the sub-area, a rear surface cover disposed to cover the outer portion of the sub-area and the display circuit board on which the display driving circuit and the touch driving circuit are arranged, and an adhesive tape covering an end of the rear surface cover adjacent to the bending area.

In an embodiment, the bending protection member may extend to cover a partial area of the outer portion of the sub-area overlapping the display area, and the bending protection member may be disposed between the rear surface cover and the outer portion of the sub-area.

In an embodiment, the display device may further includes a bending boundary pattern formed in a straight line shape or curved line shape or a combination thereof along a boundary of the outer portion and the bending area of the sub-area, where the bending protection member may cover the bending area of the sub-area with the bending boundary pattern defining the boundary.

In an embodiment, the adhesive tape may cover at least one contact area selected from a first contact area including a contact portion between the bending protection member and the bending boundary pattern and a second contact area including a contact portion between the bending boundary pattern and the rear surface cover.

In an embodiment, the bending protection member may be separated into two parts to cover the bending area and the outer portion of the sub-area, respectively, the two parts of the bending protection member may be spaced apart from each other not to overlap the bending boundary pattern at a boundary between the bending area and the outer portion of the sub-area, and the rear surface cover may be disposed to cover one of the two parts of the bending protection member covering the outer portion of the sub-area and the display driving circuit.

The display device according to embodiments of the disclosure may improve application and deposition efficiency of a bending protection member by defining the bending area where a bending protection member is formed as a bending boundary pattern and stably forming the bending protection member in the bending area.

The display device according to embodiments of the disclosure may also increase reinforcement efficiency of the bending area by improving that arrangement structure of the bending protection member, the bending boundary pattern and water-proof tape, and improve the water-proof and moisture-proof effect.

The effects of the disclosure are not limited to the aforementioned effects, and various other effects are included in the specification.

BRIEF DESCRIPTION OF THE DRAWING

The above and other features of embodiments of the disclosure will become more apparent by describing in detail embodiments thereof with reference to the attached drawings, in which.

DETAILED DESCRIPTION

Figure 1:
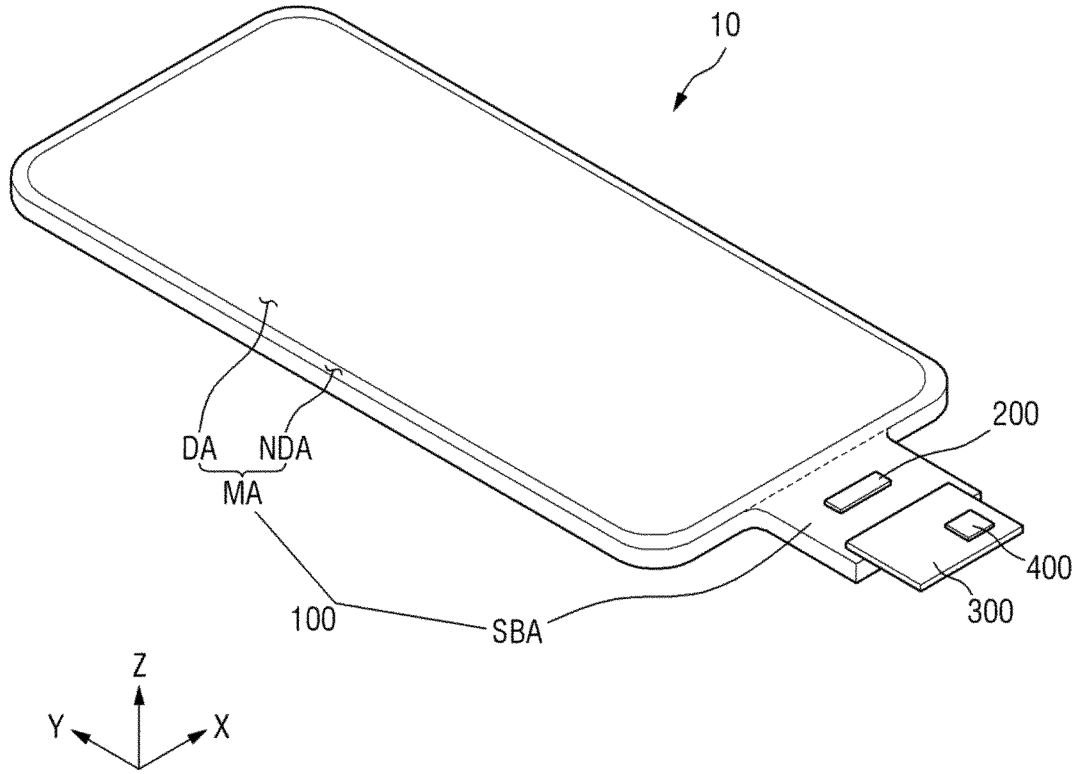
FIG. 1 is a perspective view illustrating a display device according to an embodiment of the disclosure.

The invention will now be described more fully hereinafter with reference to the accompanying drawings, in which various embodiments are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

It will also be understood that when a layer is referred to as being "on" another layer or substrate, it can be directly on the other layer or substrate, or intervening layers may also be present therebetween. In contrast, when an element is referred to as being "directly on" another element, there are no intervening elements present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the disclosure. Similarly, the second element could also be termed the first element.

The terminology used herein is for the purpose of describing particular embodiments only and is not intended to be limiting. As used herein, “a”, “an,” “the,” and “at least one” do not denote a limitation of quantity, and are intended to include both the singular and plural, unless the context clearly indicates otherwise. Thus, reference to “an” element in a claim followed by reference to “the” element is inclusive of one element and a plurality of the elements. For example, “an element” has the same meaning as “at least one element,” unless the context clearly indicates otherwise. “At least one” is not to be construed as limiting “a” or “an.” “Or” means “and/or.” As used herein, the term “and/or” includes any and all combinations of one or more of the associated listed items. It will be further understood that the terms “comprises” and/or “comprising,” or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as “lower” or “bottom” and “upper” or “top,” may be used herein to describe one element’s relationship to another element as illustrated in the Figures. It will be understood that relative terms are intended to encompass different orientations of the device in addition to the orientation depicted in the Figures. For example, if the device in one of the figures is turned over, elements described as being on the “lower” side of other elements would then be oriented on “upper” sides of the other elements. The term “lower,” can therefore, encompasses both an orientation of “lower” and “upper,” depending on the particular orientation of the figure. Similarly, if the device in one of the figures is turned over, elements described as “below” or “beneath” other elements would then be oriented “above” the other elements. The terms “below” or “beneath” can, therefore, encompass both an orientation of above and below.

Each of the features of the various embodiments of the disclosure may be combined or combined with each other, in part or in whole, and technically various interlocking and driving are possible. Each embodiment may be implemented independently of each other or may be implemented together in an association.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described in detail with reference to the accompanying drawings.

Figure 2:
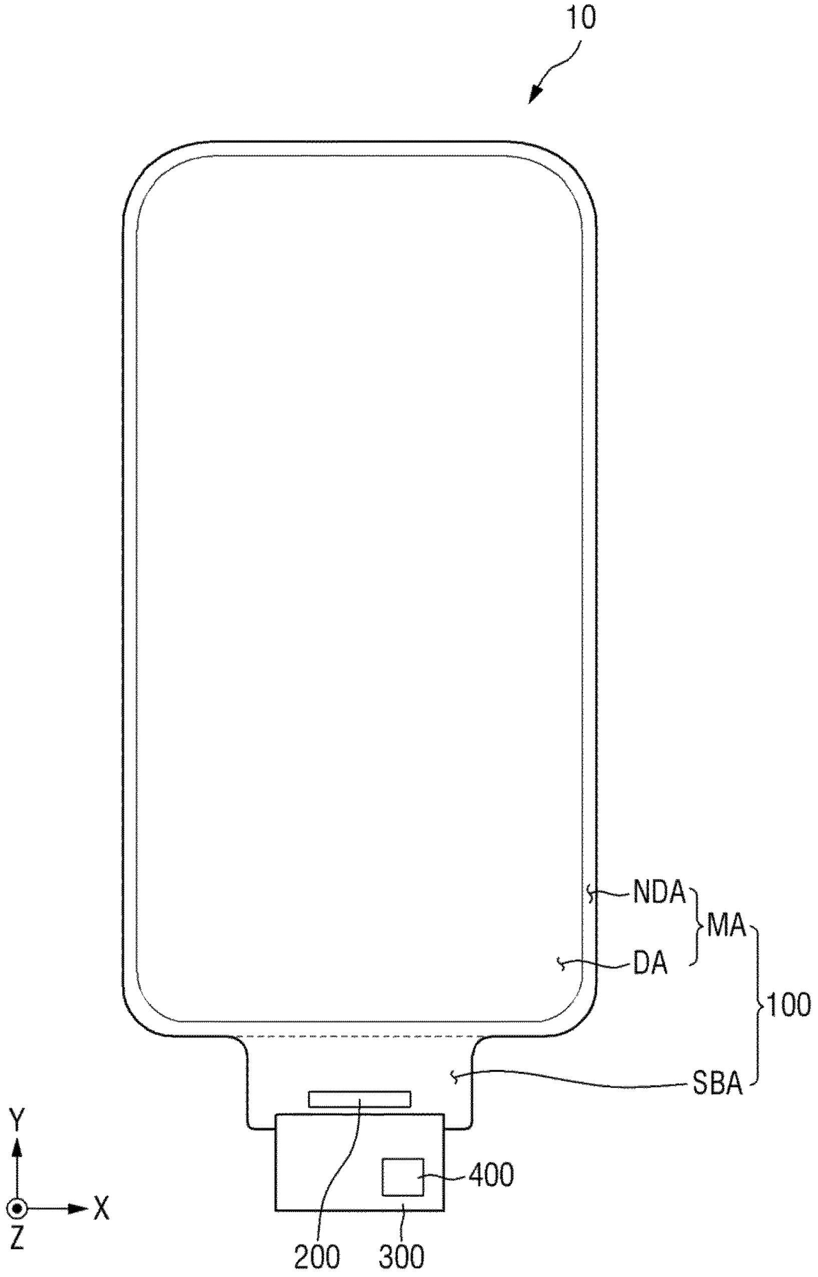
FIG. 2 is a plan view illustrating a display device according to an embodiment of the disclosure.
Figure 3:
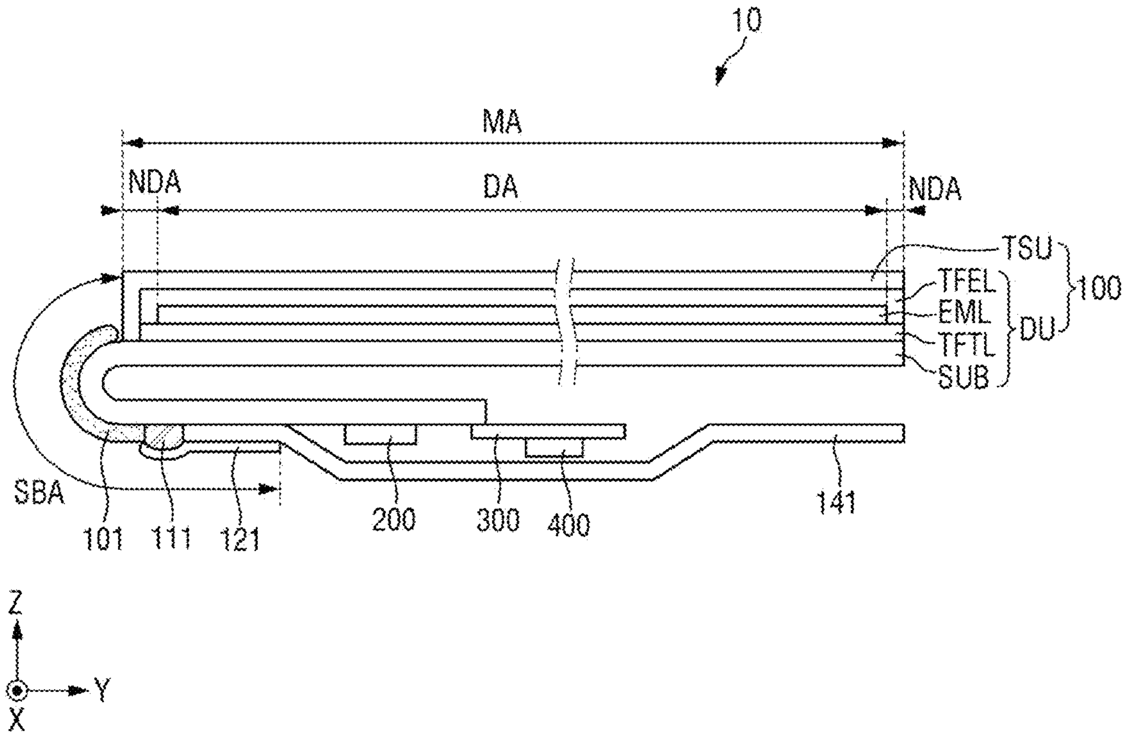
FIG. 3 is a side view of a first embodiment illustrating one side surface or a cross-sectional shape of a display device illustrated in FIGS. 1 and 2.

FIG. 1 is a perspective view illustrating a display device according to an embodiment of the disclosure, and FIG. 2 is a plan view illustrating a display device according to an embodiment of the disclosure. FIG. 3 is a side view of a first embodiment illustrating one side surface or a cross-sectional shape of a display device illustrated in FIGS. 1 and 2.

Referring to FIGS. 1 to 3, a display device 10 according to an embodiment may be applied to portable electronic devices such as a mobile phone, a smartphone, a tablet personal computer (PC), a mobile communication terminal, an electronic organizer, an electronic book, a portable multimedia player (PMP), a navigation system, an ultra mobile PC (UMPC) or the like.

In addition, the display device 10 according to an embodiment may be applied as a display unit of a television, a laptop, a monitor, a billboard, or an Internet-of-Things (IoT) terminal. Further, the display device 10 according to an embodiment may be applied to wearable devices such as a smart watch, a watch phone, a glasses type display, or a head mounted display (HMD). Alternatively, the display device 10 according to an embodiment may be applied to a dashboard of a vehicle, a center fascia of a vehicle, a center information display (CID) disposed on a dashboard of a vehicle, a room mirror display in place of side mirrors of a vehicle, or a display disposed on a rear surface of a front seat for rear seat entertainment of a vehicle.

The display device 10 according to an embodiment may be a light emitting display device such as an organic light emitting display device using an organic light emitting diode, a quantum dot light emitting display including a quantum dot light emitting layer, an inorganic light emitting display including an inorganic semiconductor, and a micro light emitting display using a micro or nano light emitting diode (LED). In the following description, embodiments where the display device 10 is an organic light emitting display device will be described for convenience of description, but the disclosure is not limited thereto.

The display device 10 according to an embodiment includes a display panel 100, a display driving circuit 200, a display circuit board 300, a touch driving circuit 400, and a rear surface cover 141.

The display panel 100 may be formed in a rectangular shape, in a plan view, having short sides in a first direction (X-axis direction) and long sides in a second direction (Y-axis direction) crossing the first direction (X-axis direction). The corner where the short side in the first direction (X-axis direction) and the long side in the second direction (Y-axis direction) meet may be rounded to have a predetermined curvature or may be right-angled. Here, a third direction (Z-axis direction) may be a direction perpendicular to the first and second directions, or a thickness direction of the display panel 100. The planar shape of the display panel 100 is not limited to the rectangular shape, and may be formed in another polygonal shape, a circular shape or an elliptical shape. The display panel 100 may be formed to be flat, but is not limited thereto. In an embodiment, for example, the display panel 100 includes a curved portion formed at left and right ends and having a constant curvature or a varying curvature. In an embodiment, the display panel 100 may be flexible so that the display panel 100 can be curved, bent, folded, or rolled.

The display panel 100 includes a main area MA and a sub-area SBA.

The main area MA includes a display area DA for displaying an image and a non-display area NDA that is a peripheral area of the display area DA. The display area DA includes pixels for displaying an image. The sub-area SBA may protrude in the second direction (Y-axis direction) from one side of the main area MA.

Although FIGS. 1 and 2 illustrate an embodiment in a state where the sub-area SBA is unfolded, the sub-area SBA may be bent as shown in FIG. 3. In a bent state, the sub-area SBA may overlap the main area MA in the third direction (Z-axis direction) which is the thickness direction of the display panel 100 to face a bottom or rear surface of the display panel 100. Hereinafter, the direction opposite to the third direction (Z-axis direction), which is a direction that the bottom or rear surface of the display panel 100 is facing will be referred to as a rear direction of the display panel 100.

Referring to FIG. 3, a bending area of the sub-area SBA that is bent in the rear direction may be predefined and set, and the display driving circuit 200 is disposed on an outer portion of the sub-area SBA extending from the bending area. In such an embodiment, the display driving circuit 200 may be disposed outside the bending area. In embodiments, the sub-area SBA may include the bending area bent in the rear direction, and the outer portion extending from the bending area to overlap main area MA or the display area DA.

A bending boundary pattern 111 is provided or formed between the bending area defined in the sub-area SBA and the outer portion, that is, on the boundary line of the bending area. In addition, a bending protection member 101 is formed in the bending area of the sub-area SBA with the bending boundary pattern 111 as a boundary thereof with the outer portion.

A moisture-proof and water-proof adhesive tape 121 may be further formed in the contact area of the bending protection member 101, the bending boundary pattern 111 and the rear surface cover 141. The moisture-proof and water-proof adhesive tape 121 may be formed to entirely cover at least one contact area selected from a first contact area, which includes the contact portion of the bending protection member 101 and the bending boundary pattern 111, and a second contact area, which includes the contact area of the bending boundary pattern 111 and the rear surface cover 141. The moisture-proof and water-proof adhesive tape 121 may be formed by covering at least a portion of each of the rear surface cover 141, the bending protection member 101 and the bending boundary pattern 111 to cover the first and second contact areas.

The bending protection member 101 may be formed to cover the sub-area SBA with the bending boundary pattern 111 as a boundary. In other words, the bending protection member 101 may be formed to cover the entire bent surface of the sub-area SBA excluding the outer portion of the sub-area SBA where the display driving circuit 200 is disposed. In an embodiment, for example, the bending protection member 101 may cover the bending area and a portion of the outer portion overlapping the non-display area NDA, while not overlapping the display area DA.

The bending boundary pattern 111 may include or be formed of an adhesive curing material such as resin, optical clear adhesive (OCA), optical clear resin (OCR), or pressure sensitive adhesive (PSA), or an inorganic material such as a pressure sensitive adhesive material or photoresist, but the disclosure is not limited thereto.

During the process of forming the bending protection member 101 in the bending area, that is, the process of coating and applying the bending protection member 101 to the bending area, the bending boundary pattern 111 may prevent the phenomenon of the bending protection member 101 leaving or overflowing to the area other than the bending area. That is, the bending boundary pattern 111 establishes a bending area of the sub-area SBA where the bending protection member 101 is formed and a boundary between the bending area and the outer portion. Accordingly, during the process of coating and applying the bending protection member 101, the bending boundary pattern 111 prevents the bending protection member 101 from overflowing to the outer portion of the sub-area SBA (e.g., the outer portion where the display driving circuit 200 is disposed).

In an embodiment, the bending protection member 101 covers the bending area, reinforces the rigidity of the bending area, and performs a water-proof function such as preventing moisture penetration. In an embodiment, the bending protection member 101 covers the signal lines, that is, wires formed in the bending area, to protect the wires from external impact or friction.

The bending protection member 101 may be coated or applied to the bending area through a coating or application process such as an inkjet printing process, a photoresist process, or a spin coating process. Such bending protection member 101 may include or be formed of an organic or inorganic material formed in a pixel defining layer, a planarization layer, or an encapsulation layer TFEL formed in the display area DA. In an embodiment, the bending protection member 101 may include or be formed of a separate organic material such as acrylic, benzocyclobutene (BCB), hexamethyldisiloxane (HMDSO), or the likes. Alternatively, the bending protection member 101 may include or be formed of a pressure sensitive adhesive material such as ultraviolet (UV) curable acrylic resin, but the disclosure is not limited thereto.

In an embodiment, as shown in FIG. 3, the display panel 100 includes a display module DU including a substrate SUB, a thin film transistor layer TFTL, a light emitting element layer EML, and an encapsulation layer TFEL, and a touch sensing unit TSU disposed or formed on a front surface of the display module DU.

The thin film transistor layer TFTL may be disposed on the substrate SUB. The thin film transistor layer TFTL may be arranged in the main area MA and the sub-area SBA. The thin film transistor layer TFTL includes thin film transistors.

The light emitting element layer EML may be disposed on the thin film transistor layer TFTL. The light emitting element layer EML may be arranged in the display area DA of the main area MA. The light emitting element layer EML includes light emitting elements arranged in light emitting units.

The encapsulation layer TFEL may be disposed on the light emitting element layer EML. The encapsulation layer TFEL may be arranged in the display area DA and the non-display area NDA of the main area MA. The encapsulation layer TFEL includes at least one inorganic layer and at least one organic layer for encapsulating the light emitting element layer.

The touch sensing unit TSU may be formed on the encapsulation layer TFEL or be mounted on the encapsulation layer TFEL. The touch sensing unit TSU may be disposed on the display area DA of the main area MA. The touch sensing unit TSU may sense a touch of a person or an object using touch electrodes.

A cover window (not shown) may be disposed on the touch sensing unit TSU to protect the upper portion of the display panel 100. The cover window may be attached onto the touch sensing unit TDU with a transparent adhesive material such as an OCA film or an OCR. The cover window may include or be made of an inorganic material such as glass, or an organic material such as plastic or a polymer material. In an embodiment, a polarizing layer may be additionally disposed between the touch sensing unit TSU and the cover window to prevent a decrease in visibility of the image due to reflection of external light.

The display driving circuit 200 may generate signals and voltages for driving the display panel 100. The display driving circuit 200 may be formed as an integrated circuit (IC) and attached onto the display panel 100 by a chip on glass (COG) method, a chip on plastic (COP) method, or an ultrasonic bonding method, but the disclosure is not limited thereto. In an embodiment, for example, the display driving circuit 200 may be attached onto the display circuit board 300 by a chip on film (COF) method.

The display circuit board 300 may be attached to one end of the sub-area SBA of the display panel 100. Thus, the display circuit board 300 may be electrically connected to the display panel 100 and the display driving circuit 200. The display panel 100 and the display driving circuit 200 may receive digital video data, timing signals, and driving voltages through the display circuit board 300. The display circuit board 300 may be a flexible printed circuit board, a printed circuit board, or a flexible film such as a chip on film.

The touch driving circuit 400 may be disposed on the display circuit board 300. The touch driving circuit 400 may be formed as an IC and attached to the display circuit board 300.

The touch driving circuit 400 may be electrically connected to the touch electrodes of the of the touch sensing unit TSU. The touch driving circuit 400 may apply touch driving signals to the touch electrodes of the touch sensing unit TSU and measure the charge change amount of each mutual capacitance of each of the plurality of the touch nodes formed by the touch electrodes. Specifically, the touch driving circuit 400 measures capacitance changes of the plurality of touch nodes according to changes in the voltage magnitude or current amount of the touch detection signal received through the touch electrodes. In this manner, the touch driving circuit 400 may determine whether a user's touch, a user's approach, or the like has been made or not according to the charge change amount of the mutual capacitance of each of the plurality of the touch nodes. The user's touch means that an object such as a user's finger or a pen is in direct contact with one surface of the cover window disposed on the touch sensing unit TSU. The user's approach means that the object such as the user's body part or the pen hovers above one surface of the cover window.

The rear surface cover 141 is disposed and assembled on the rear surface of the display panel 100 to entirely cover at least a partial surface of the sub-area SBA (for example, a partial outer surface of the sub-area SBA) bent in the rear direction of the display panel 100, the display driving circuit 200, and the display circuit board 300 in which the touch driving circuit 400 is disposed.

One end of the rear surface cover 141 may be disposed to cover a portion of the outer surface of the sub-area SBA and contact the bending boundary pattern 111 or cover the bending boundary pattern 111. Alternatively, one end of the rear surface cover 141 may be disposed to cover the bending boundary pattern 111 as well as a portion of the side surface of the bending protection member 101 formed in the sub-area SBA. The opposing end of the rear surface cover 141 is disposed to cover the opposing side of the rear surface of the display panel 100.

Figure 4:
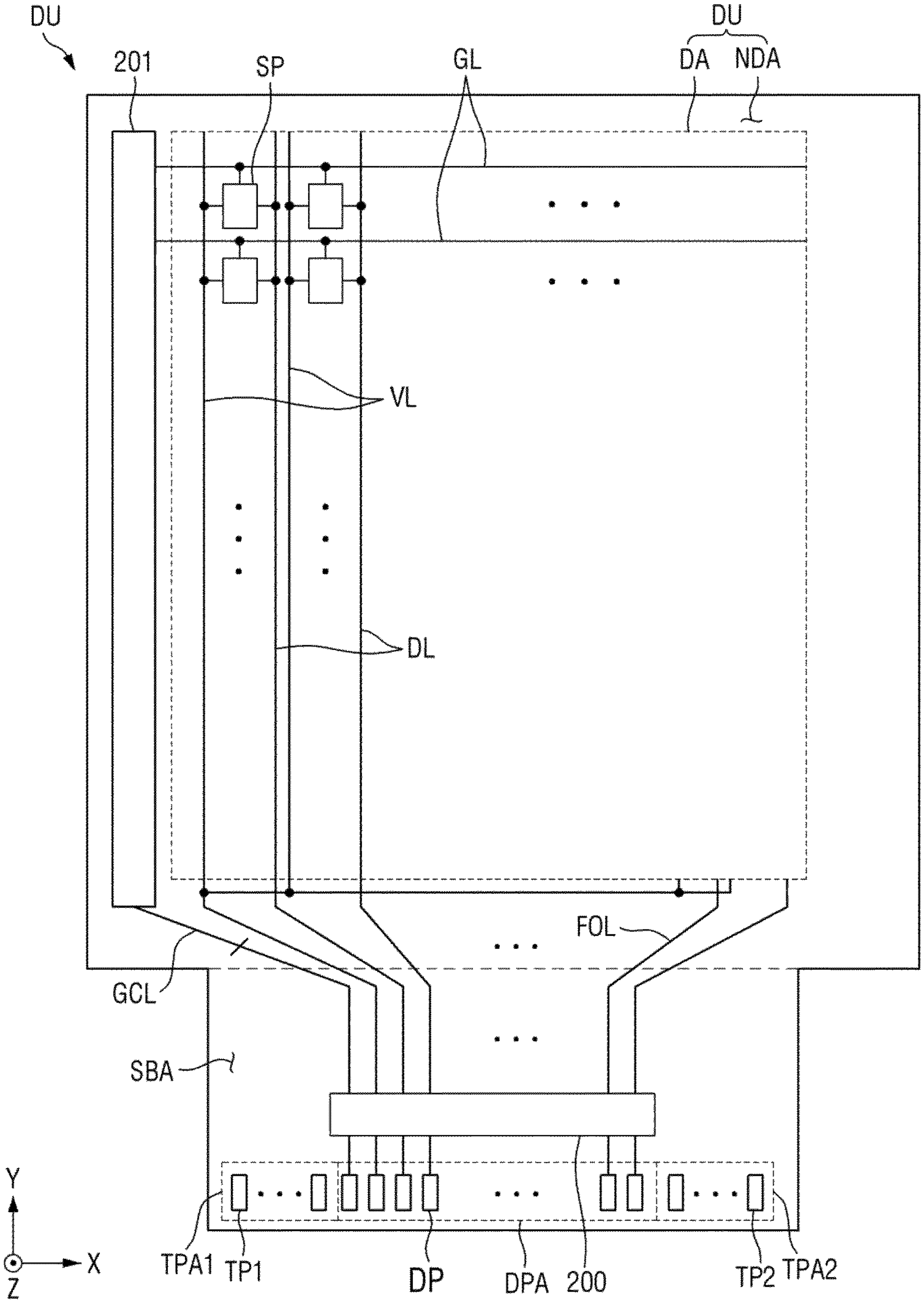
FIG. 4 is a view showing an example of the display panel shown in FIGS. 1 to 3.

FIG. 4 is a view showing an example of the display panel shown in FIGS. 1 to 3. Specifically, FIG. 4 is a schematic plan view showing the display area DA and the non-display area NDA of the display module DU before the touch sensing unit TSU is formed or provided thereon.

The display area DA displays images therein and may be defined as a central area of the display panel 100. The display area DA may include a plurality of pixels SP, a plurality of gate lines GL, a plurality of data lines DL and a plurality of voltage lines VL. Each of the plurality of pixels SP may be defined as the minimum unit that outputs light.

The plurality of gate lines GL may supply the gate signals received from a gate driver 201 to the plurality of pixels SP. The plurality of gate lines GL may extend in the X-axis direction (or the first direction) and may be spaced apart from one another in the Y-axis direction (or the second direction) crossing the X-axis direction.

The plurality of data lines DL may provide the data voltages received from the display driving circuit 200 to the plurality of pixels SP. The plurality of data lines DL may extend in the Y-axis direction and may be spaced apart from one another in the X-axis direction.

The plurality of voltage lines VL may supply the supply voltage received from the display driving circuit 200 to the plurality of pixels SP. The supply voltage may include at least one selected from a driving voltage, an initialization voltage, and a reference voltage. The plurality of voltage lines VL may extend in the Y-axis direction and may be spaced apart from one another in the X-axis direction.

The non-display area NDA may surround the display area DA. The non-display area NDA may include the gate driver 201, fan-out lines FOL, and gate control lines GCL. The gate driver 201 may generate a plurality of gate signals based on the gate control signal, and may sequentially supply the plurality of gate signals to the plurality of gate lines GL in a predetermined order.

The fan-out lines FOL may extend from the display driving circuit 200 to the display area DA. The fan-out lines FOL may supply the data voltage received from the display driving circuit 200 to the plurality of data lines DL.

The gate control lines GCL may extend from the display driving circuit 200 to the gate driver 201. The gate control lines GCL may supply the gate control signal received from the display driving circuit 200 to the gate driver 201.

The sub-area SBA may include the display driving circuit 200, a display pad area DPA, and first and second touch pad areas TPA1 and TPA2.

The display driving circuit 200 may output signals and voltages for driving the display panel 100 to the fan-out lines FOL. The display driving circuit 200 may provide data voltages to the data lines DL through the fan-out lines FOL. The data voltages may be applied to the plurality of pixels SP, so that the luminance of the plurality of pixels SP may be determined. The display driving circuit 200 may supply a gate control signal to the gate driver 201 through the gate control lines GCL.

The display pad area DPA, the first touch pad area TPA1 and the second touch pad area TPA2 may be defined or disposed on the edge portion of the sub-area SBA. The display pad area DPA, the first touch pad area TPA1 and the second touch pad area TPA2 may be electrically connected to the display circuit board 300 using a low-resistance, high-reliability material such as an anisotropic conductive film or a semi-additive plating (SAP).

The display pad area DPA may include a plurality of display pads. The plurality of display pads may be connected to the display driving circuit 200 or the touch driving circuit 400 through the display circuit board 300. The plurality of display pads may be connected to the display circuit board 300 to receive digital video data and may provide digital video data to the display driving circuit 200.

Figure 5:
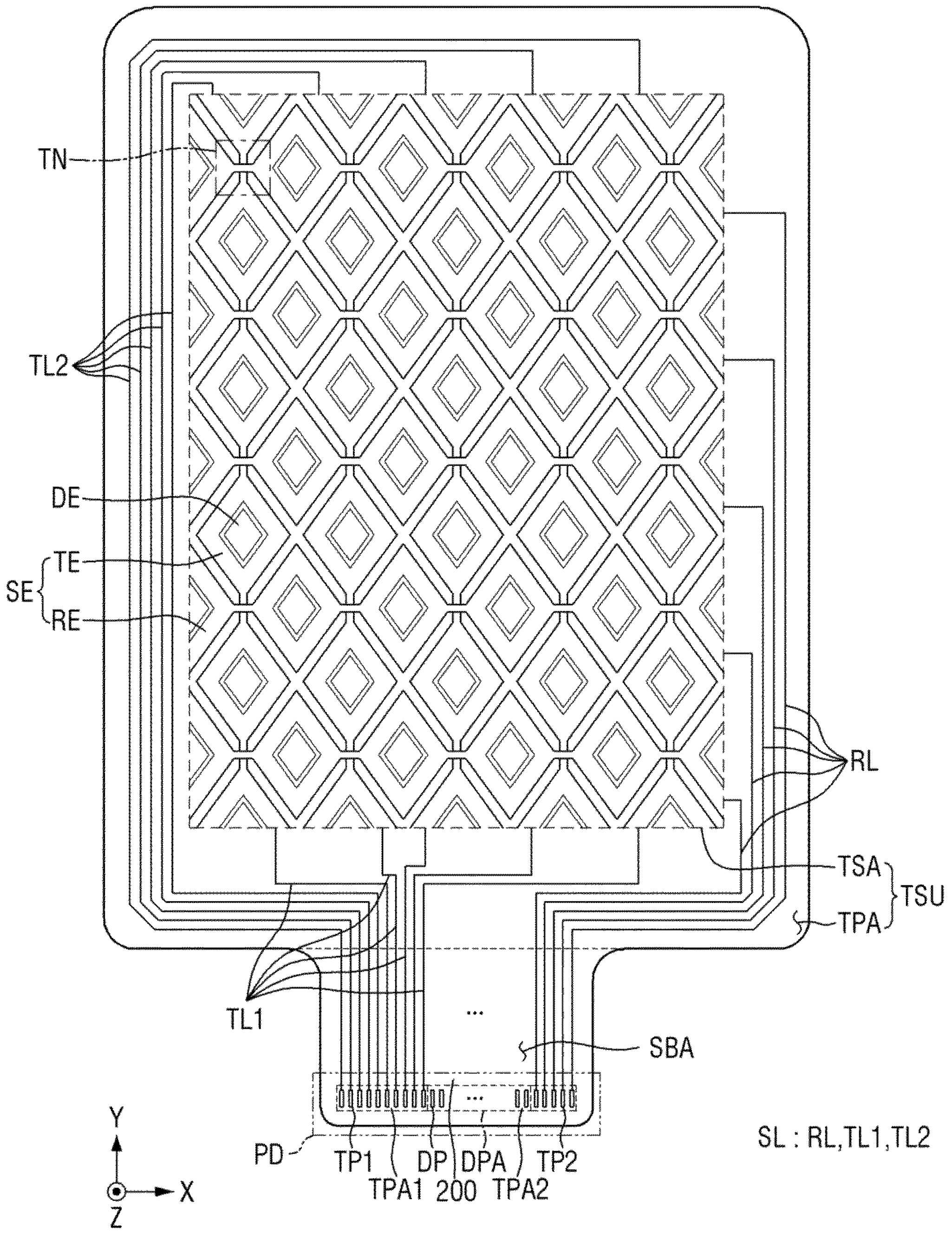
FIG. 5 is a view illustrating an example of a touch sensing unit shown in FIG. 3.

FIG. 5 is a view illustrating an example of a touch sensing unit shown in FIG. 3.

Referring to FIG. 5, the touch electrodes SE of the main area MA include two kinds of electrodes, e.g., the driving electrodes TE and the sensing electrodes RE. The mutual capacitive sensing is carried out by applying touch driving signals to the driving electrode TE, and then sensing the amount of change in the mutual capacitance of each of the touch nodes TN through the sensing electrodes RE. It should be noted that the type and arrangement structure of the touch electrodes SE and the method of driving the touch electrodes SE are not limited to the capacitive sensing.

For convenience of illustration, FIG. 5 shows only the driving electrodes TE, the sensing electrodes RE, dummy patterns DE, touch lines SL, and first and second touch pads TP1 and TP2.

Referring to FIG. 5, the main area MA of the touch sensing unit TSU includes a touch sensing area TSA for sensing a user's touch, and a touch peripheral area TPA disposed around a touch sensing area TSA. The touch sensing area TSA may overlap the display area DA of FIGS. 1 to 3 in the third direction (Z-axis direction), and the touch peripheral area TPA may overlap the non-display area NDA in the third direction (Z-axis direction).

In the touch sensing area TSA, the driving electrodes TE, the sensing electrodes RE and the dummy patterns DE are disposed. The driving electrodes TE and the sensing electrodes RE may be electrodes for forming mutual capacitance to sense a touch of an electronic pen or a person.

The driving electrodes TE may be arranged in the first direction (X-axis direction) and second direction (Y-axis direction). The driving electrodes TE adjacent to each other in the first direction (X-axis direction) are electrically separated from to each other, while the driving electrodes TE adjacent to each other in the second direction (Y-axis direction) are electrically connected to each other. The driving electrodes TE adjacent to one another in the second direction (Y-axis direction) may be connected through separated connection electrodes.

The sensing electrodes RE may be arranged in the first direction (x-axis direction) and second direction (Y-axis direction). The sensing electrodes RE adjacent to each other in the first direction (X-axis direction) may be electrically connected with each other in the first direction (X-axis direction). In addition, the sensing electrodes RE adjacent to each other in the second direction (Y-axis direction) may be electrically separated from each other. Accordingly, touch nodes TN where mutual capacitance is formed may be formed at intersections of the driving electrodes TE and the sensing electrodes RE. A plurality of touch nodes TN may be associated with the intersections of the driving electrodes TE and the sensing electrodes RE, respectively.

Each of the dummy patterns DE may be surrounded by the driving electrode TE or the sensing electrode RE. Each of the dummy patterns DE may be electrically separated from the driving electrode TE or the sensing electrode RE. Each of the dummy patterns DE may be spaced apart from the driving electrode TE or the sensing electrode RE. Each of the dummy patterns DE may be electrically floating.

In an embodiment, as shown in FIG. 5, the driving electrodes TE, the sensing electrodes RE and the dummy patterns DE each have a diamond shape when viewed from the top, but the disclosure is not limited thereto. In an embodiment, for example, each of the driving electrodes TE, the sensing electrodes RE and the dummy patterns DE may have other quadrangular shape than a diamond, other polygonal shapes than a quadrangular shape, a circle or an ellipse when viewed from the top.

Touch lines SL may be disposed around the touch sensing area TSA, i.e., in the touch peripheral area TPA. The touch lines SL include first touch driving lines TL1 and second touch driving lines TL2 connected to the driving electrodes TE, and touch sensing lines RL connected to the sensing electrodes RE.

The sensing electrodes RE disposed on one side of the touch sensing area TSA may be connected to the touch sensing lines RL, respectively. In an embodiment, for example, some of the sensing electrodes RE electrically connected with one another in the first direction (X-axis direction) that are disposed at the right end may be connected to the touch sensing lines RL, respectively, as shown in FIG. 5. Each of the touch sensing lines RL may be connected to a pad unit PD via a portion of the touch peripheral area TPA. In an embodiment, for example, the touch sensing lines RL may extend around the right side of the touch sensing area TSA and may be connected to second touch pads TP2 disposed in the pad unit PD, respectively.

The driving electrodes TE disposed at one end of the touch sensing area TSA may be connected to the first touch driving lines TL1, respectively, while the driving electrodes TE disposed at the opposite end of the touch sensing area TSA may be connected to the second touch driving lines TL2, respectively. In an embodiment, for example, some of the driving electrodes TE electrically connected to one another in the second direction (Y-axis direction) that are disposed at the lower end may be connected to the first touch driving lines TL1, respectively, while some of the driving electrodes TE disposed at the upper end may be connected to the second touch driving lines TL2, respectively.

The first or second touch driving lines TL1 and TL2 may be connected to the pad unit PD formed in the sub-area SBA of the display panel 100 via a portion of the touch peripheral area TPA. In an embodiment, for example, the second touch driving lines TL2 may extend around the left side of the touch sensing area TSA and connected to the driving electrodes TE on the upper side of the touch sensing area TSA. In addition, the first and second touch driving lines TL1 and TL2 may be connected to the pad unit PD formed in the sub-area SBA on the lower side of the touch sensing area TSA. The first and second touch driving lines TL1 and TL2 may be connected to first touch pads TP1 disposed on the pad unit PD, respectively.

The driving electrodes TE are connected to the first and second touch driving lines TL1 and TL2 on the two sides of the touch sensing area TSA to receive touch driving signals through the first and second touch driving lines TL1 and TL2 on the two sides. Accordingly, it is possible to prevent a difference between the touch driving signals applied to the driving electrodes TE disposed on the lower side of touch sensing area TSA and the touch driving signals applied to the driving electrodes TE disposed on the upper side of the touch sensing area TSA due to a RC delay of the touch driving signals.

In an embodiment, as shown in FIGS. 1 to 3, where the display circuit board 300 is connected to one side of the flexible film, the display pad area DPA and the first and second touch pad areas TPA1 and TPA2 of the pad area PD may be associated with pads of the display panel 100 connected to the display circuit board 300. Accordingly, the pads of the display panel 100 may be in contact with the display pads DP, the first touch pads TP1 and the second touch pads TP2. The display pads DP, the first touch pads TP1 and the second touch pads TP2 may be electrically connected to the pads of the display circuit board 300 using a low-resistance, high-reliability material such as an anisotropic conductive layer or a SAP. Therefore, the display pads DP, the first touch pads TP1 and the second touch pads TP2 may be electrically connected to the touch driving circuit 400 disposed on the display circuit board 300.

Figure 6:
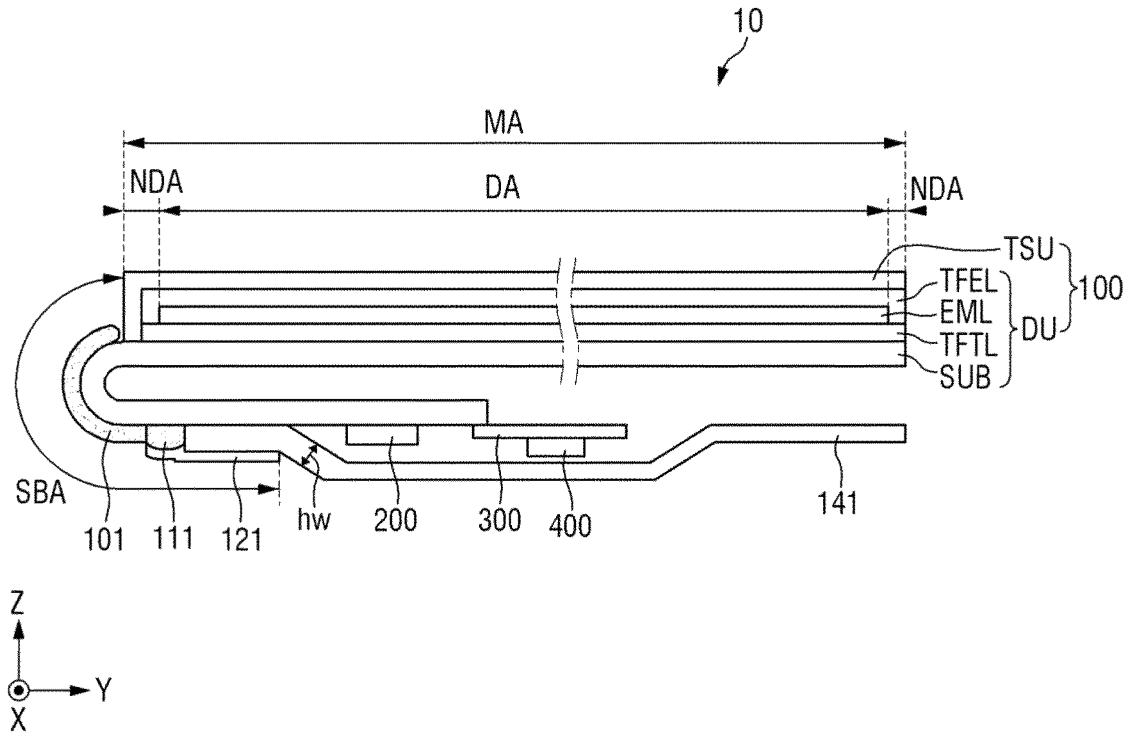
FIG. 6 is a side view of another embodiment illustrating one side surface or a cross-sectional shape of a display device illustrated in FIGS. 1 and 2.

FIG. 6 is a side view of another embodiment illustrating one side surface or a cross-sectional shape of a display device illustrated in FIGS. 1 and 2.

Referring to FIG. 6, in an embodiment, the bending boundary pattern 111 may be formed in a straight or curved line shape or a shape in which a straight line and a curved line are combined along the boundary of the bending area which sets the boundary between the bending area of the sub-area SBA and the outer portion of the sub-area SBA.

The bending protection member 101 is formed to cover the bending area of the preset sub-area SBA with the bending boundary pattern 111 as a boundary. Accordingly, one side of the bending protection member 101 may be in contact with one side of the bending boundary pattern 111.

The rear surface cover 141 is disposed and assembled on the rear surface of the display panel 100 to entirely cover at least a partial surface of the sub-area SBA (for example, a partial outer surface of the sub-area SBA) bent in the rear direction of the display panel 100, the display driving circuit 200, and the display circuit board 300 in which the touch driving circuit 400 is disposed.

One end of the rear surface cover 141 is disposed to cover a portion of the side of the sub-area SBA to be in contact with the bending boundary pattern 111, and the opposing end thereof is disposed to cover another end (or an opposing end) of the rear surface of the display panel 100.

In an embodiment, the moisture-proof and water-proof adhesive tape 121 may cover an end of the rear surface cover 141 adjacent to the bending area of the sub-area SBA. The moisture-proof and water-proof adhesive tape 121 may be formed to cover at least one contact area selected from a first contact area including a contact portion between the bending protection member 101 and the bending boundary pattern 111, and a second contact area including a contact portion between the bending boundary pattern 111 and the rear surface cover 141. The moisture-proof and water-proof adhesive tape 121 may be formed by covering at least a portion of the bending protection member 101, the bending boundary pattern 111, and the rear surface cover 141 to cover the first and second contact areas described above.

In an embodiment, as shown in FIG. 6, a thickness hw or the height of one end portion of the rear surface cover 141 that is adjacent to the bending boundary pattern 111 and covers at least a partial surface of the sub-area SBA (for example, a partial outer surface of the sub-area SBA) bent in the rear direction of the display panel 100 may be formed to be thicker or higher than the thickness or the height of the bending protection member 101 and the thickness or the height of the bending boundary pattern 111. In such an embodiment, the rear surface cover 141 may prevent the bending protection member 101 and the bending boundary pattern 111 from escaping or overflowing into areas other than the bending area.

The moisture-proof and water-proof adhesive tape 121 may be formed to cover at least one contact area selected from a first contact area including a contact portion between the bending protection member 101 and the bending boundary pattern 111, and a second contact area including a contact portion between the bending boundary pattern 111 and the rear surface cover 141.

Figure 7:
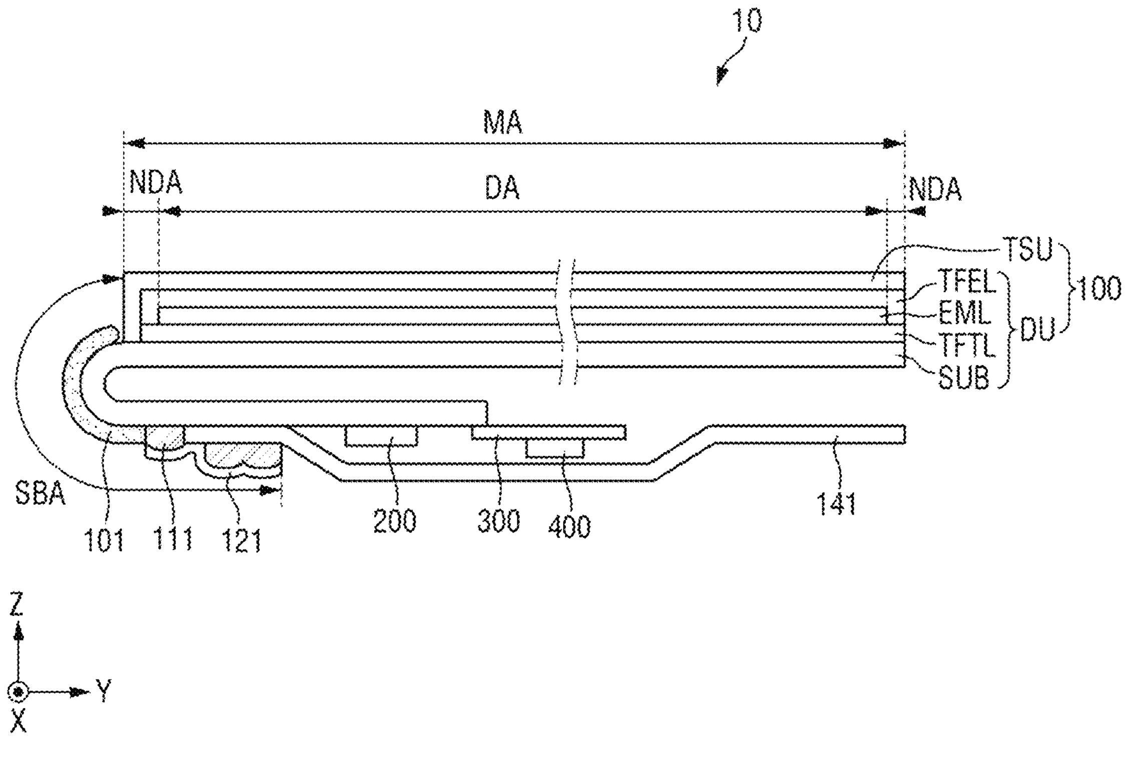
FIG. 7 is a side view of another embodiment illustrating one side surface or a cross-sectional shape of a display device illustrated in FIGS. 1 and 2.

FIG. 7 is a side view of another embodiment illustrating one side surface or a cross-sectional shape of a display device illustrated in FIGS. 1 and 2.

Referring to FIG. 7, in an embodiment, the bending boundary pattern 111 may be formed in a straight or curved line shape or a shape in which a straight line and a curved line are combined along the boundary of the bending area which sets the boundary in respect to the bending area of the sub-area SBA and the outer portion of the sub-area SBA.

The bending protection member 101 is formed to cover the bending area of the preset sub-area SBA with the bending boundary pattern 111 as a boundary. Accordingly, one side of the bending protection member 101 may be in contact with one side of the bending boundary pattern 111.

The rear surface cover 141 is disposed and assembled on the rear surface of the display panel 100 to entirely cover at least a partial surface of the sub-area SBA (for example, a partial outer surface of the sub-area SBA) bent in the rear direction of the display panel 100, the display driving circuit 200, and the display circuit board 300 in which the touch driving circuit 400 is disposed.

In an embodiment, the bending boundary pattern 111 may be further formed as a single pattern on the rear outer surface of the rear surface cover 141 that covers at least a portion of the sub-area SBA. In such an embodiment, the bending boundary pattern 111 may be further formed on the rear outer surface of the rear surface cover 141 may be referred to as an additional bending boundary pattern. In another embodiment, the additional bending boundary pattern further formed on the rear outer portion of the rear surface cover 141 may be formed as a plurality of parallel patterns.

The moisture-proof and water-proof adhesive tape 121 may be formed to cover at least one contact area selected from a first contact area including a contact portion between the bending protection member 101 and the bending boundary pattern 111, a second contact area including a contact portion between the bending boundary pattern 111 and the rear surface cover 141, and a third contact area including a contact portion between the rear surface cover 141 and the additional bending boundary pattern further formed on the rear outer portion of the rear surface cover 141. The moisture-proof and water-proof adhesive tape 121 may be formed by covering at least a portion of the bending protection member 101, the bending boundary pattern 111, and the rear surface cover 141 to cover the first to third contact areas described above.

Figure 8:
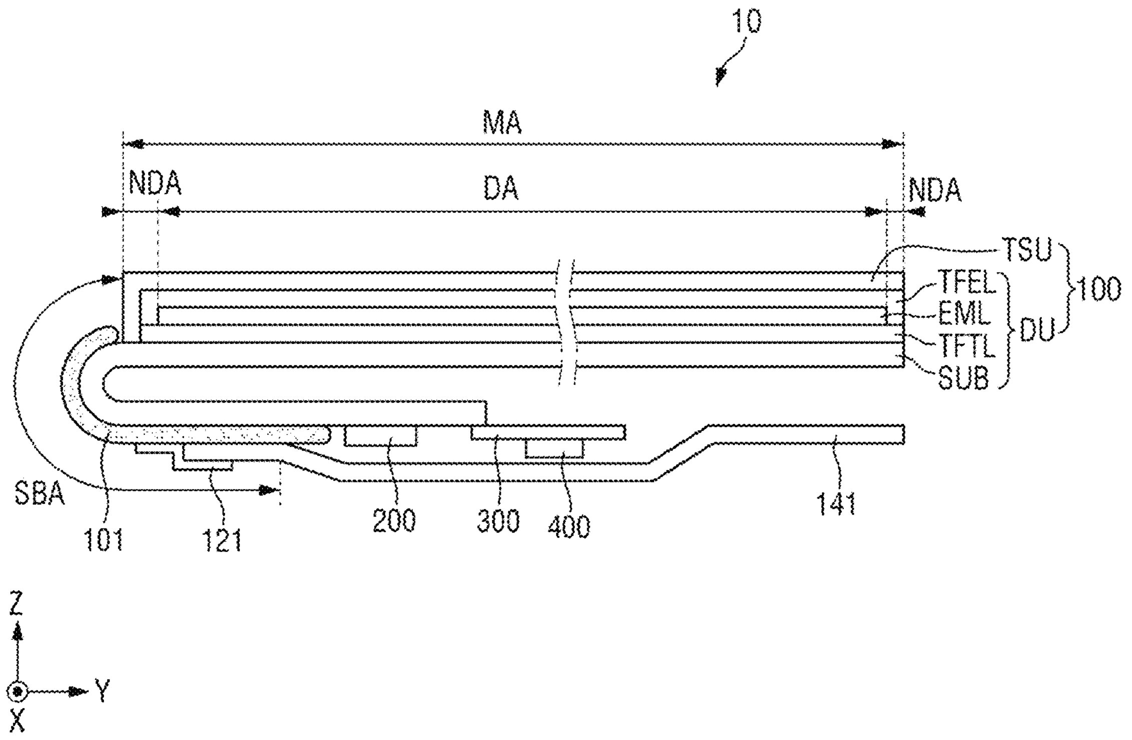
FIG. 8 is a side view of another embodiment illustrating one side surface or a cross-sectional shape of a display device illustrated in FIGS. 1 and 2.

FIG. 8 is a side view of another embodiment illustrating one side surface or a cross-sectional shape of a display device illustrated in FIGS. 1 and 2.

Referring to FIG. 8, in an embodiment, the bending protection member 101 may be formed to cover the bending area of the sub-area SBA and a partial area of the outer portion of the sub-area SBA. In such an embodiment, the bending protection member 101 may extend further toward the display driving circuit 200 to overlap the display area DA. Accordingly, one side of the bending protection member 101 may be disposed in a side area adjacent to the display driving circuit 200 formed on the outer portion of the sub-area SBA.

The rear surface cover 141 may be disposed and assembled in the rear direction of the display panel to cover least a partial surface of the sub-area SBA (for example, a partial outer surface of the sub-area SBA) bent in the rear direction of the display panel 100, the rear partial surface of the bending protection member 101, the display driving circuit 200, and the display circuit board 300 in which the touch driving circuit 400 is disposed.

The moisture-proof and water-proof adhesive tape 121 may be formed to cover a contact area including the contact portion between the bending protection member 101 and the rear surface cover 141. That is, the moisture-proof and water-proof adhesive tape 121 may be formed by covering at least a portion of the bending protection member 101 and the rear surface cover 141 to cover the contact portion between the bending protection member 101 and the rear surface cover 141.

Figure 9:
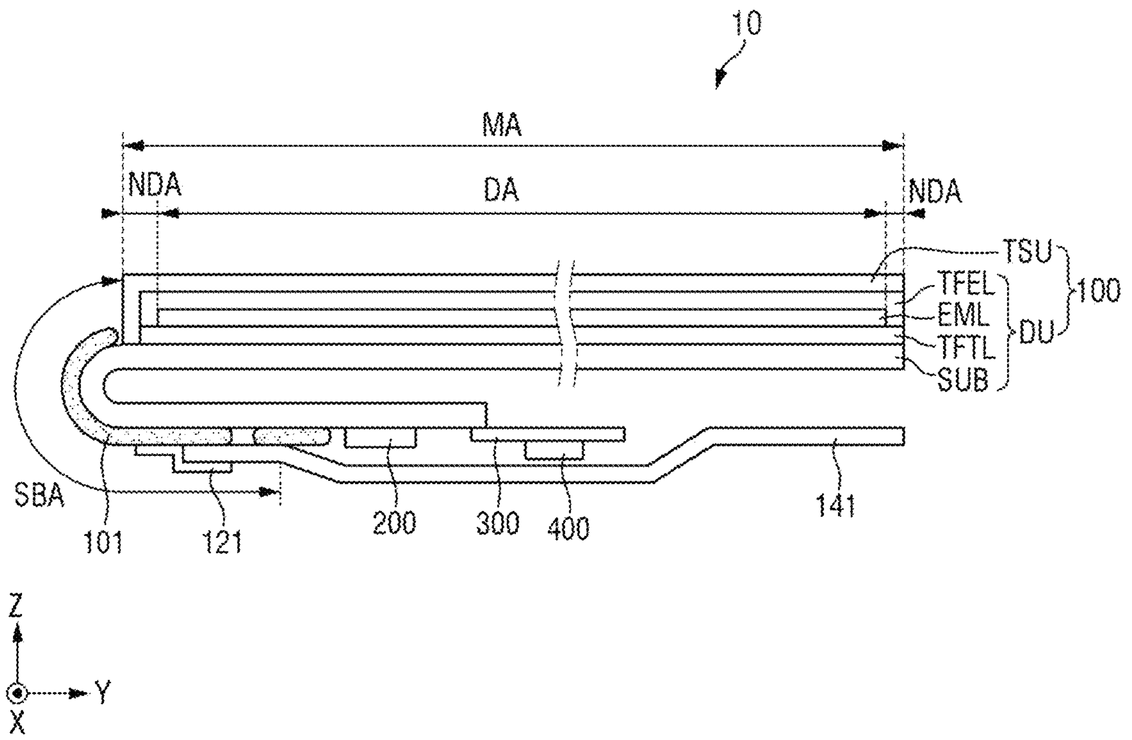
FIG. 9 is a side view of another embodiment illustrating one side surface or a cross-sectional shape of a display device illustrated in FIGS. 1 and 2.

FIG. 9 is a side view of another embodiment illustrating one side surface or a cross-sectional shape of a display device illustrated in FIGS. 1 and 2.

Referring to FIG. 9, in an embodiment, the bending protection member 101 may be formed in separate forms to cover a preset bending area of the sub-area SBA and a partial area of the outer portion the sub-area SBA.

The bending protection member 101 on the outer portion and separated (or spaced apart) from the bending protection member 101 formed on the bending area of the sub-area SBA may be disposed in a side area adjacent to the display driving circuit 200 formed on the outer portion.

The rear surface cover 141 is disposed and assembled in the rear direction of the display panel 100 to cover a rear partial surface of the bending protection member 101 formed in the sub-area SBA, the display driving circuit 200, and the display circuit board 300 on which the touch driving circuit 400 are disposed.

The moisture-proof and water-proof adhesive tape 121 may be formed to cover a contact area including the contact portion between the bending protection member 101 and the rear surface cover 141. That is, the moisture-proof and water-proof adhesive tape 121 may be formed by covering at least a portion of the bending protection member 101 and the rear surface cover 141 so as to cover the contact portion between the bending protection member 101 and the rear surface cover 141.

Figure 10:
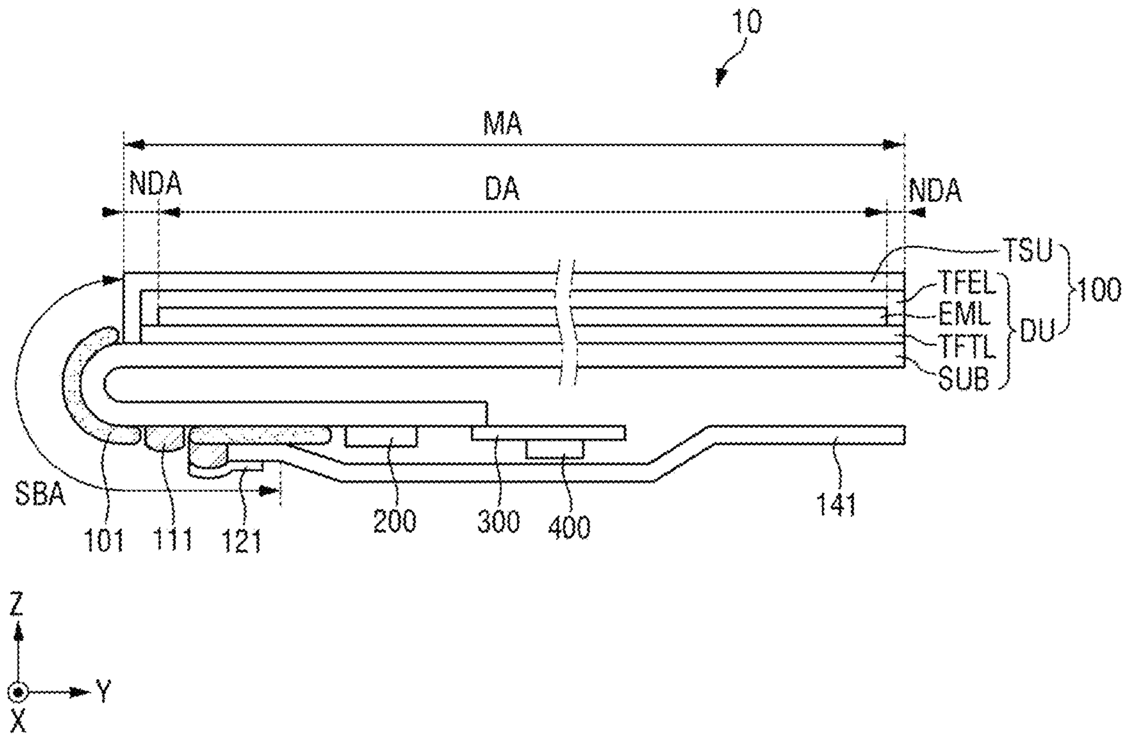
FIG. 10 is a side view of another embodiment illustrating one side surface or a cross-sectional shape of a display device illustrated in FIGS. 1 and 2.

FIG. 10 is a side view of another embodiment illustrating one side surface or a cross-sectional shape of a display device illustrated in FIGS. 1 and 2.

Referring to FIG. 10, in an embodiment, the bending boundary pattern 111 may be formed in a straight or curved line shape or a shape in which a straight line and a curved line are combined along the boundary of the bending area which sets the boundary in respect to the bending area of the sub-area SBA and the outer portion of the sub-area SBA.

The bending protection member 101 may be formed in separate forms (or separated into two parts) to cover the bending area of the preset sub-area SBA and a partial area of the outer portion of the sub-area SBA, respectively, but not to overlap the bending boundary pattern 111 at a boundary between the bending area and the outer portion of the sub-area SBA.

The bending boundary pattern 111 may be further formed on the rear outer portion of the bending protection member 101 that covers a partial area of the outer portion of the sub-area SBA.

The moisture-proof and water-proof adhesive tape 121 may be formed to cover a contact area including the contact portion between at least one bending protection member and the rear surface cover 141. That is, the moisture-proof and water-proof adhesive tape 121 may be formed by covering at least a portion of the bending protection member 101 and the rear surface cover 141 so as to cover the contact portion between the bending protection member 101 and the rear surface cover 141.

Figure 11:
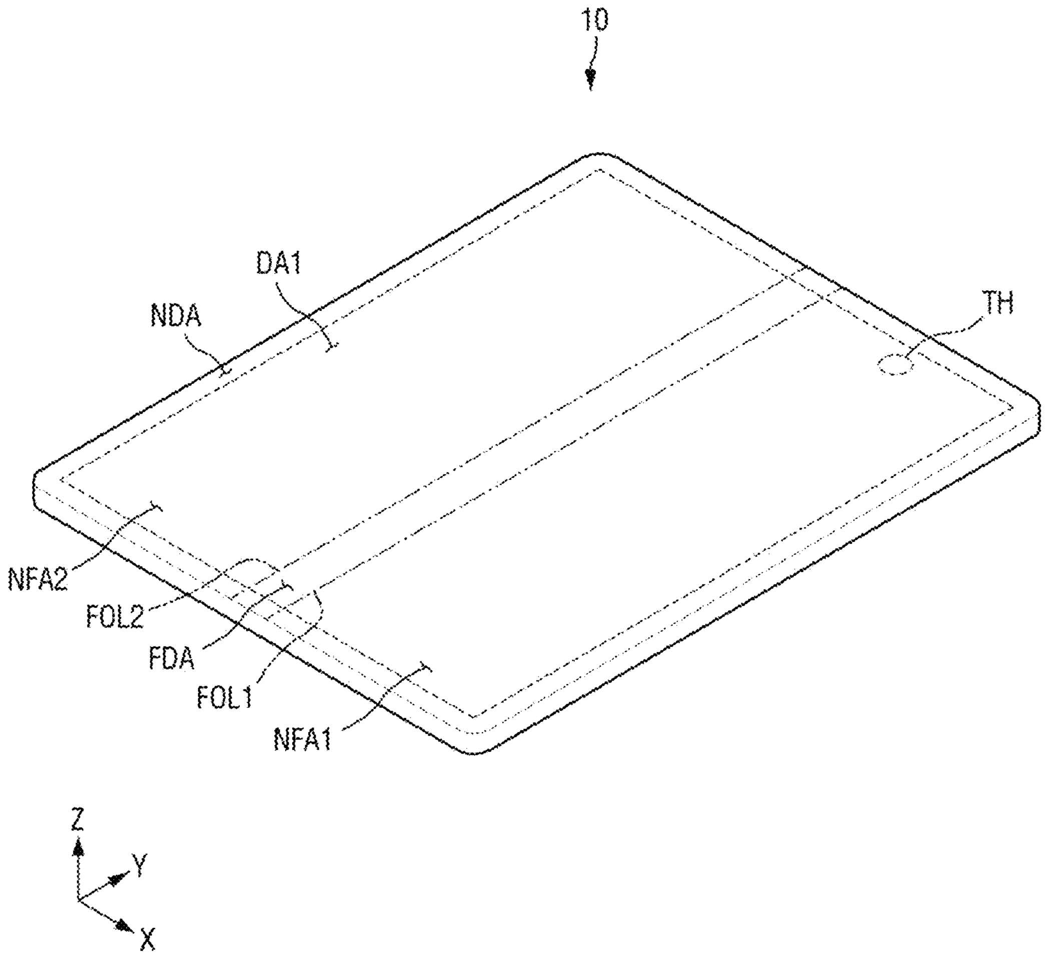
FIGS. 11 and 12 are perspective views illustrating display devices according to other embodiments of the disclosure.
Figure 12:
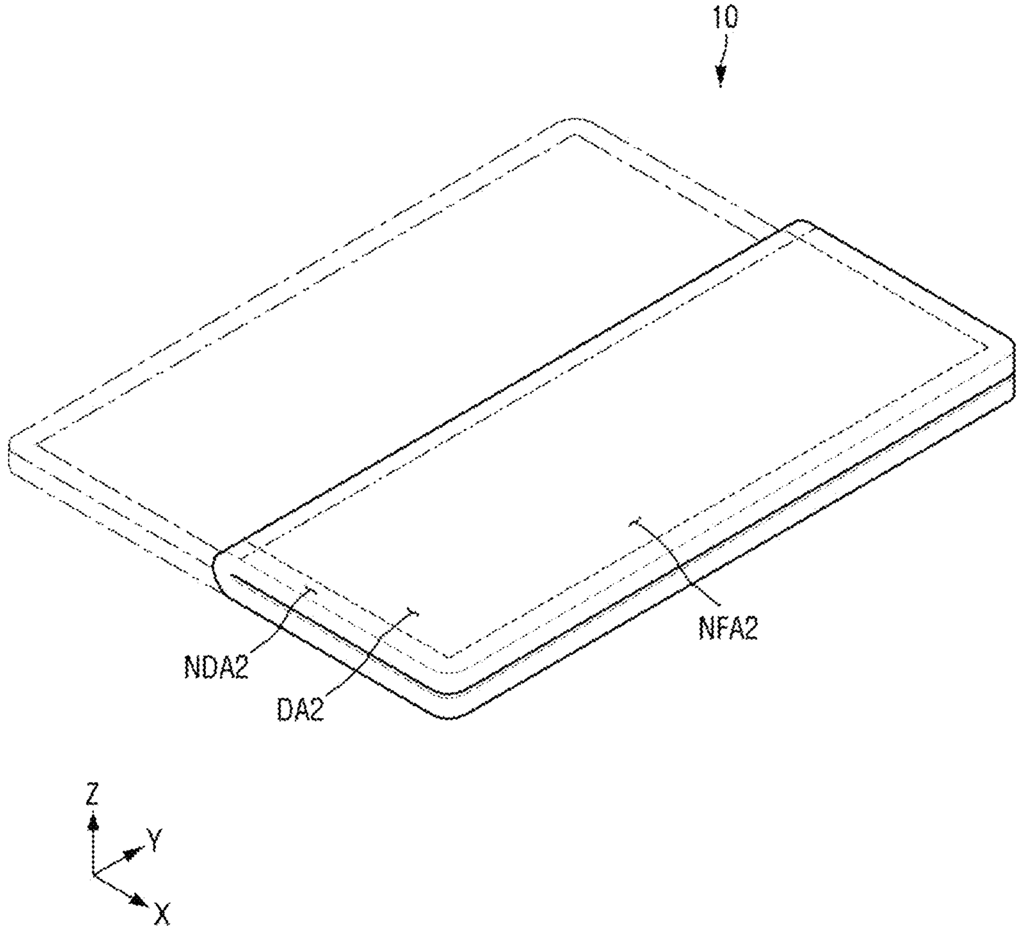

FIGS. 11 and 12 are perspective views illustrating display devices according to other embodiments of the disclosure.

FIGS. 11 and 12 illustrate an embodiment of the display device 10 that is a foldable display device that is folded in the first direction (X-axis direction). The display device 10 may maintain both a folded state and an unfolded state. The display device 10 may be folded in an in-folding manner in which the front surface is disposed on the inside thereof. When the display device 10 is bent or folded in the in-folding manner, the front surfaces of the display device 10 may be disposed to face each other. Alternatively, the display device 10 may be folded in an out-folding manner in which the front surface is disposed on the outside thereof. When the display device 10 is bent or folded in the out-folding manner, the rear surfaces of the display device 10 may be disposed to face each other.

A first non-folding area NFA1 may be disposed on one side, for example, the right side of a folding area FDA. A second non-folding area NFA2 may be disposed on the other side, for example, the left side of the folding area FDA. The touch sensing unit TSU according to an embodiment of the disclosure may be disposed on each of the first non-folding area NFA1 and the second non-folding area NFA2.

A first folding line FOL1 and a second folding line FOL2 extend in the second direction (Y-axis direction), and the display device 10 may be folded in the first direction (X-axis direction). Accordingly, the length of the display device 10 in the first direction (X-axis direction) may be reduced to approximately half, so that a user can conveniently carry the display device 10.

In embodiments, the extension direction of the first folding line FOL1 and the extension direction of the second folding line FOL2 are not limited to the second direction (Y-axis direction). In an embodiment, for example, the first folding line FOL1 and the second folding line FOL2 may extend in the first direction (X-axis direction), and the display device 10 may be folded in the second direction (Y-axis direction). In such an embodiment, the length of the display device 10 in the second direction (Y-axis direction) may be reduced to approximately half. Alternatively, the first folding line FOL1 and the second folding line FOL2 may extend in the diagonal direction of the display device 10 between the first direction (X-axis direction) and the second direction (Y-axis direction). In this case, the display device 10 may be folded in a triangular shape.

In an embodiment where the first folding line FOL1 and the second folding line FOL2 extend in the second direction (Y-axis direction), the length of the folding area FDA in the first direction (X-axis direction) may be shorter than the length thereof in the second direction (Y-axis direction). Further, the length of the first non-folding area NFA1 in the first direction (X-axis direction) may be longer than the length of the folding area FDA in the first direction (X-axis direction). The length of the second non-folding area NFA2 in the first direction (X-axis direction) may be longer than the length of the folding area FDA in the first direction (X-axis direction).

A first display area DA1 may be disposed on the front surface of the display device 10. The first display area DA1 may overlap the folding area FDA, the first non-folding area NFA1, and the second non-folding area NFA2 in the third direction (Z-axis direction). Therefore, when the display device 10 is unfolded, an image may be displayed toward the front side thereof in the folding area FDA, the first non-folding area NFA1, and the second non-folding area NFA2 of the display device 10.

A second display area DA2 may be disposed on the rear surface of the display device 10. The second display area DA2 may overlap the second non-folding area NFA2 in the third direction (Z-axis direction). Therefore, when the display device 10 is folded, an image may be displayed toward the front side thereof in the second non-folding area NFA2 of the display device 10.

FIGS. 11 and 12 illustrate that a through hole TH having a camera formed therein is disposed in the first non-folding area NFA1, but the disclosure is not limited thereto. The through hole TH or the camera may be defined or disposed in the second non-folding area NFA2 or the folding area FDA.

Figure 13:
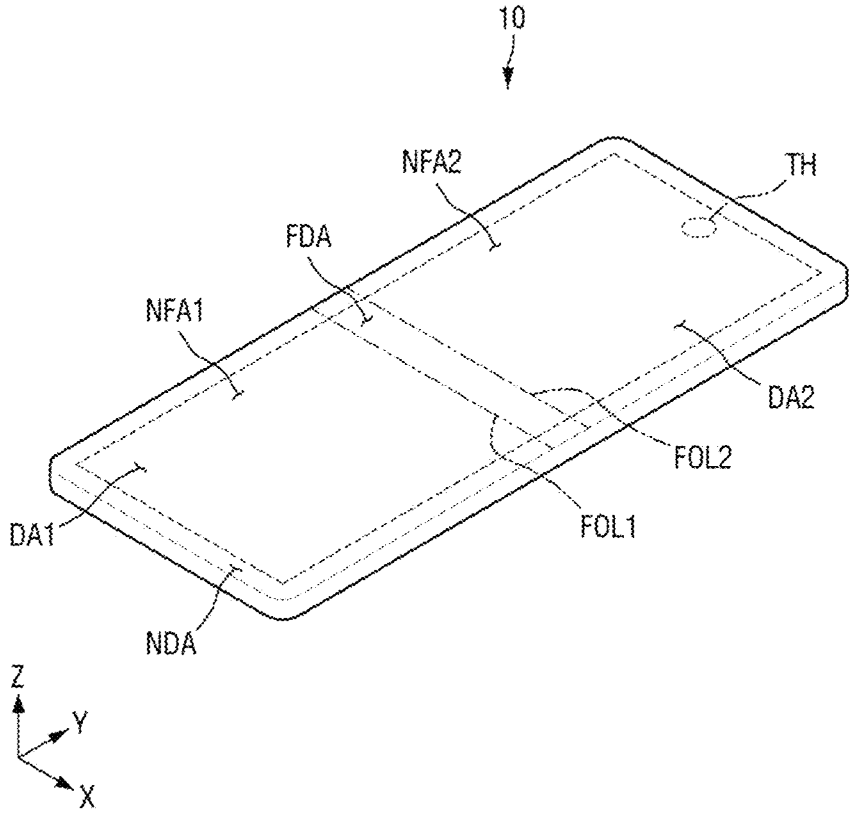
FIGS. 13 and 14 are perspective views illustrating display devices according to still other embodiments of the disclosure.
Figure 14:
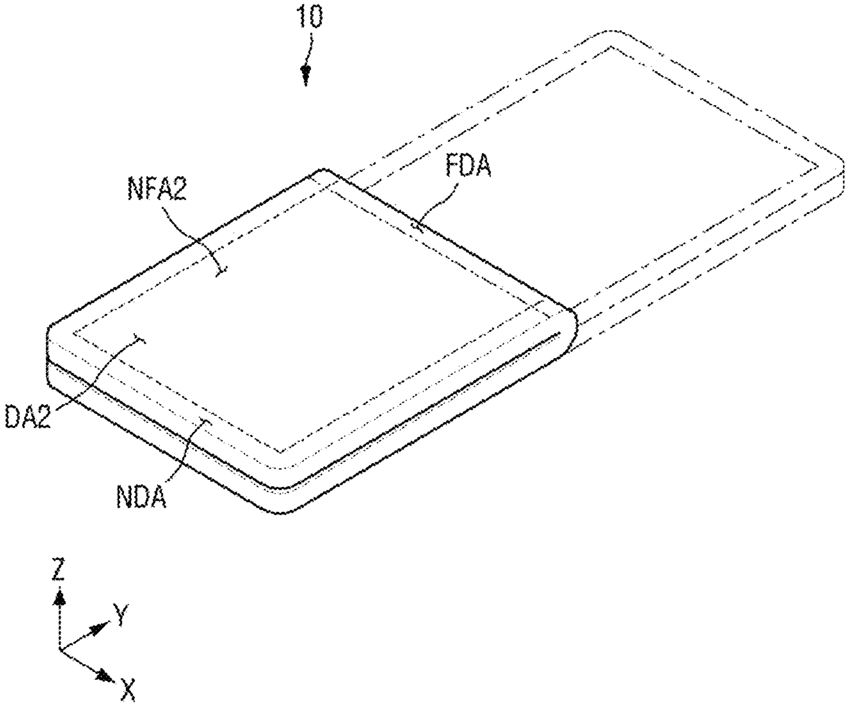

FIGS. 13 and 14 are perspective views illustrating display devices according to still other embodiments of the disclosure.

FIGS. 13 and 14 illustrate an embodiment of the display device 10 that is a foldable display device that is folded in the second direction (Y-axis direction). The display device 10 may maintain both a folded state and an unfolded state. The display device 10 may be folded in an in-folding manner in which the front surface is disposed on the inside thereof. When the display device 10 is bent or folded in the in-folding manner, the front surfaces of the display device 10 may be disposed to face each other. Alternatively, the display device 10 may be folded in an out-folding manner in which the front surface is disposed on the outside thereof. When the display device 10 is bent or folded in the out-folding manner, the rear surfaces of the display device 10 may be disposed to face each other.

The display device 10 may include a folding area FDA, the first non-folding area NFA1, and the second non-folding area NFA2. The folding area FDA may be an area in which the display device 10 is folded, and the first and second non-folding areas NFA1 and NFA2 may be areas in which the display device 10 is not folded. The first non-folding area NFA1 may be disposed on one side (e.g., a lower side) of the folding area FDA. The second non-folding area NFA2 may be disposed on the other side (e.g., an upper side) of the folding area FDA.

The touch sensing unit TSU according to an embodiment of the disclosure may be disposed on each of the first non-folding area NFA1 and the second non-folding area NFA2.

In an embodiment, the folding area FDA may be a curved area with a predetermined curvature at a first folding line FOL1 and a second folding line FOL2. Thus, the first folding line FOL1 may be the boundary between the folding area FDA and the first non-folding area NFA1, and the second folding line FOL2 may be the boundary between the folding area FDA and the second non-folding area NFA2.

In an embodiment, the first folding line FOL1 and the second folding line FOL2 may extend in the first direction (X-axis direction) as shown in FIGS. 13 and 14. In such an embodiment, the display device 10 may be folded in the second direction (Y-axis direction). Accordingly, the length of the display device 10 in the second direction (Y-axis direction) may be reduced to approximately half, so that a user can conveniently carry the display device 10.

In embodiments, the extension direction of the first folding line FOL1 and the extension direction of the second folding line FOL2 are not limited to the first direction (X-axis direction). In an embodiment, for example, the first folding line FOL1 and the second folding line FOL2 may extend in the second direction (Y-axis direction), and the display device 10 may be folded in the first direction (X-axis direction). In such an embodiment, the length of the display device 10 in the first direction (X-axis direction) may be reduced to approximately half. Alternatively, the first folding line FOL1 and the second folding line FOL2 may extend in the diagonal direction of the display device 10 between the first direction (X-axis direction) and the second direction (Y-axis direction). In this case, the display device 10 may be folded in a triangular shape.

In an embodiment where the first folding line FOL1 and the second folding line FOL2 extend in the first direction (X-axis direction) as shown in FIGS. 13 and 14, the length of the folding area FDA in the second direction (Y-axis direction) may be shorter than the length of the folding area FDA in the first direction (X-axis direction). Further, the length of the first non-folding area NFA1 in the second direction (Y-axis direction) may be longer than the length of the folding area FDA in the second direction (Y-axis direction). The length of the second non-folding area NFA2 in the second direction (Y-axis direction) may be longer than the length of the folding area FDA in the second direction (Y-axis direction).

The first display area DA1 may be disposed on the front surface of the display device 10. The first display area DA1 may overlap the folding area FDA, the first non-folding area NFA1, and the second non-folding area NFA2 in the third direction (Z-axis direction). Therefore, when the display device 10 is unfolded, an image may be displayed toward the front side thereof in the folding area FDA, the first non-folding area NFA1, and the second non-folding area NFA2 of the display device 10.

The second display area DA2 may be disposed on the rear surface of the display device 10. The second display area DA2 may overlap the second non-folding area NFA2 in the third direction (Z-axis direction). Therefore, when the display device 10 is folded, an image may be displayed toward the front side thereof in the second non-folding area NFA2 of the display device 10.

FIGS. 13 and 14 illustrate an embodiment where the through hole TH in which the camera or the like is disposed is defined or disposed in the second non-folding area NFA2, but the disclosure is not limited thereto. In an embodiment, for example, the through hole TH may be disposed in the first non-folding area NFA1 or the folding area FDA.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel comprising a display area for displaying an image and a sub-area extending in one direction from the display area, wherein the sub-area includes a bending area bent in a rear direction of the display area, and an outer portion extending from the bending area to overlap the display area;

a display driving circuit disposed on the outer portion of the sub-area to drive pixels of the display area;

a bending protection member disposed to cover the bending area of the sub-area;

a rear surface cover disposed on a rear surface of the display panel to cover the outer portion of the sub-area, and the display driving circuit; and an adhesive tape covering a rear surface of an end portion of the rear surface cover adjacent to the bending area, wherein the adhesive tape covers a contact area including a contact portion between the bending protection member and the rear surface cover.

2. The display device of claim 1, wherein the bending protection member extend to cover a partial area of the outer portion of the sub-area overlapping the display area, and wherein the bending protection member is disposed between the rear surface cover and the outer portion of the sub-area.

3. The display device of claim 2, wherein a portion of the bending protection member, which is disposed between the rear surface cover and the outer portion of the sub-area, is separated into two portion, which are spaced apart from each other, and wherein one of the two portion is disposed adjacent to the display driving circuit.

4. The display device of claim 1, further comprising a bending boundary pattern formed in a straight line shape, a curved line shape or a combination thereof along a boundary of the outer portion and the bending area of the sub-area, wherein the bending protection member covers the bending area of the sub-area with the bending boundary pattern defining the boundary.

5. The display device of claim 4, wherein the adhesive tape covers at least one contact area selected from a first contact area including the contact portion between the bending protection member and the bending boundary pattern and a second contact area including a contact portion between the bending boundary pattern and the rear surface cover.

6. The display device of claim 5, wherein a thickness or a height of the end portion of the rear surface cover, which is adjacent to the bending boundary pattern, is formed to be thicker or higher than a thickness or a height of the bending protection member or a thickness or a height of the bending boundary pattern.

7. The display device of claim 4, further comprising an additional bending boundary pattern formed on a rear surface of the rear surface cover, and wherein the adhesive tape is formed to cover at least one contact area selected from a first contact area including a contact portion between the bending protection member and the bending boundary pattern, a second contact area including a contact portion between the bending boundary pattern and the rear surface cover, and a third contact area including a contact portion between the rear surface of the rear surface cover and the additional bending boundary pattern.

8. The display device of claim 4, wherein the bending protection member is separated into two parts to cover the bending area and the outer portion of the sub-area, respectively, wherein the two parts of the bending protection member are spaced apart from each other not to overlap the bending boundary pattern at a boundary between the bending area and the outer portion of the sub-area, and wherein the rear surface cover is disposed to cover one of the two parts of the bending protection member covering the outer portion of the sub-area and the display driving circuit.

9. The display device of claim 8, further comprising an additional bending boundary pattern formed on the one of the two parts of the bending protection member covering the outer portion of the sub-area, and wherein the adhesive tape covers a contact portion between the additional bending boundary pattern and the rear surface cover.

10. The display device of claim 4, wherein the bending protection member is coated or applied in the bending area through at least one process selected from an inkjet printing process, a photoresist process, and a spin coating process, wherein the bending protection member includes an organic or inorganic material used to form a pixel defining layer, a planarization layer, and an encapsulation layer formed in the display area, at least one organic material selected from acrylic, benzocyclobutene (BCB), or hexamethyldisiloxane (HMDSO), or a pressure sensitive adhesive material including ultraviolet (UV)-curable acrylic resin.

11. The display device of claim 4, wherein the bending boundary pattern includes at least one adhesive curing material selected from resin, optical clear adhesive (OCA), optical clear resin (OCR), or pressure sensitive adhesive (PSA), or an inorganic material including at least one selected from a pressure sensitive adhesive and a photoresist.

12. An electronic device comprising the display device of claim 1.

13. A display device comprising:

a display panel comprising a display area for displaying an image and a sub-area extending in one direction from the display area, wherein the sub-area includes a bending area bent in a rear direction of the display area, and an outer portion extending from the bending area to overlap the display area;

a touch sensing unit formed on a front surface of the display area to sense a touch of a user or an object;

a display driving circuit disposed on the outer portion of the sub-area to drive pixels of the display area;

a display circuit board electrically connected to one end of the outer portion of the sub-area;

a touch driving circuit disposed on the display circuit board to drive a touch sensing unit;

a bending protection member formed to cover the bending area of the sub-area;

a rear surface cover disposed to cover the outer portion of the sub-area and the display circuit board on which the display driving circuit and the touch driving circuit are arranged; and an adhesive tape covering a rear surface of an end portion of the rear surface cover adjacent to the bending area, wherein the adhesive tape covers a contact area including a contact portion between the bending protection member and the rear surface cover.

14. The display device of claim 13, wherein the bending protection member extend to cover a partial area of the outer portion of the sub-area overlapping the display area, and wherein the bending protection member is disposed between the rear surface cover and the outer portion of the sub-area.

15. The display device of claim 13, further comprising a bending boundary pattern formed in a straight line shape or curved line shape or a combination thereof along a boundary of the outer portion and the bending area of the sub-area, wherein the bending protection member covers the bending area of the sub-area with the bending boundary pattern defining the boundary.

16. The display device of claim 15, wherein the adhesive tape covers at least one contact area selected from a first contact area including the contact portion between the bending protection member and the bending boundary pattern and a second contact area including a contact portion between the bending boundary pattern and the rear surface cover.

17. The display device of claim 15, wherein the bending protection member is separated into two parts to cover the bending area and the outer portion of the sub-area, respectively, wherein the two parts of the bending protection member are spaced apart from each other not to overlap the bending boundary pattern at a boundary between the bending area and the outer portion of the sub-area, and wherein the rear surface cover is disposed to cover one of the two parts of the bending protection member covering the outer portion of the sub-area and the display driving circuit.

18. An electronic device comprising the display device of claim 13.

* * * * *